May 11, 1926.
W. A. CHRISTIANS
HAY CARRIER
Filed July 14, 1923   2 Sheets-Sheet 1
1,584,610
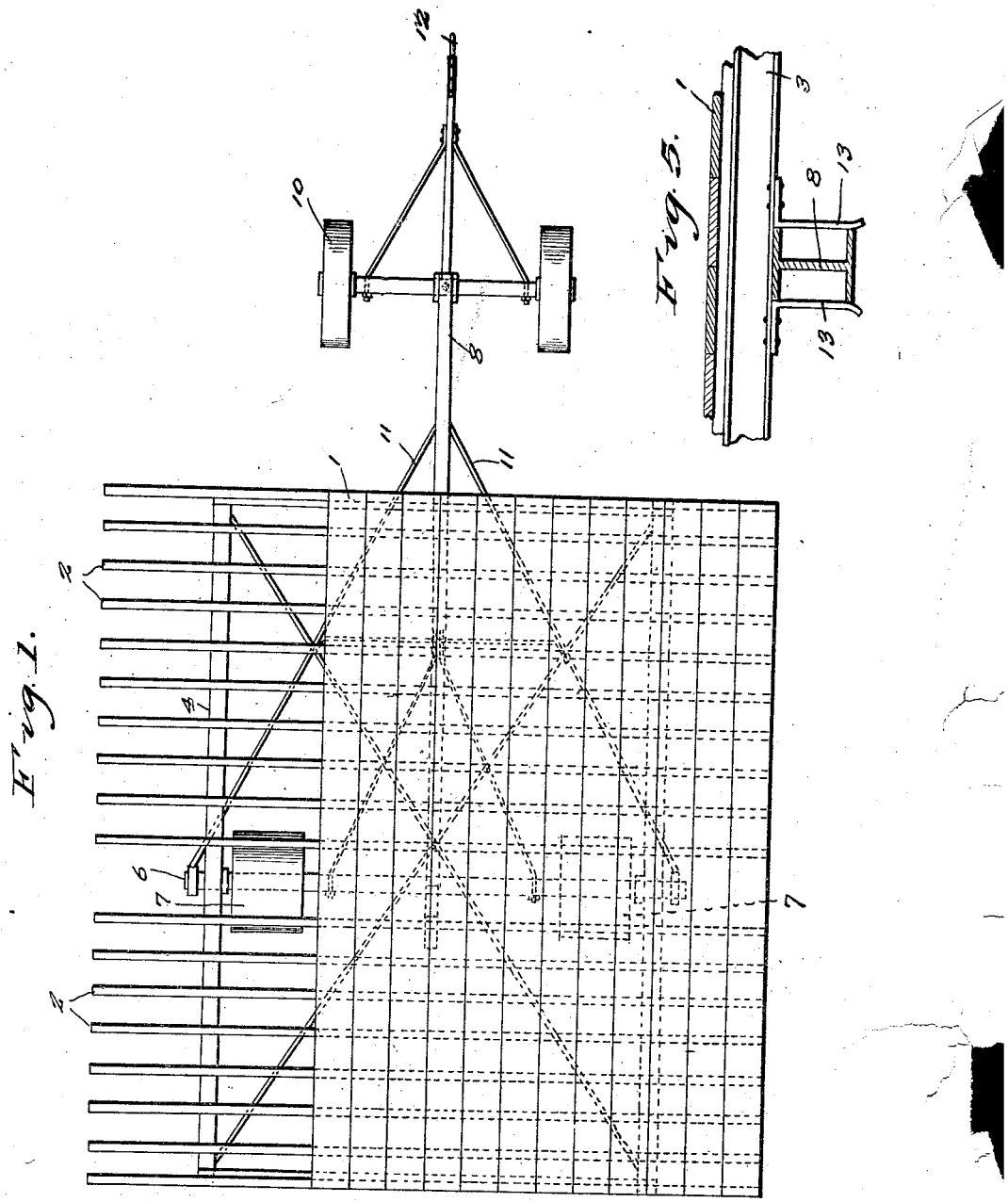

May 11, 1926.
W. A. CHRISTIANS
HAY CARRIER
Filed July 14, 1923
1,584,610
2 Sheets-Sheet 2
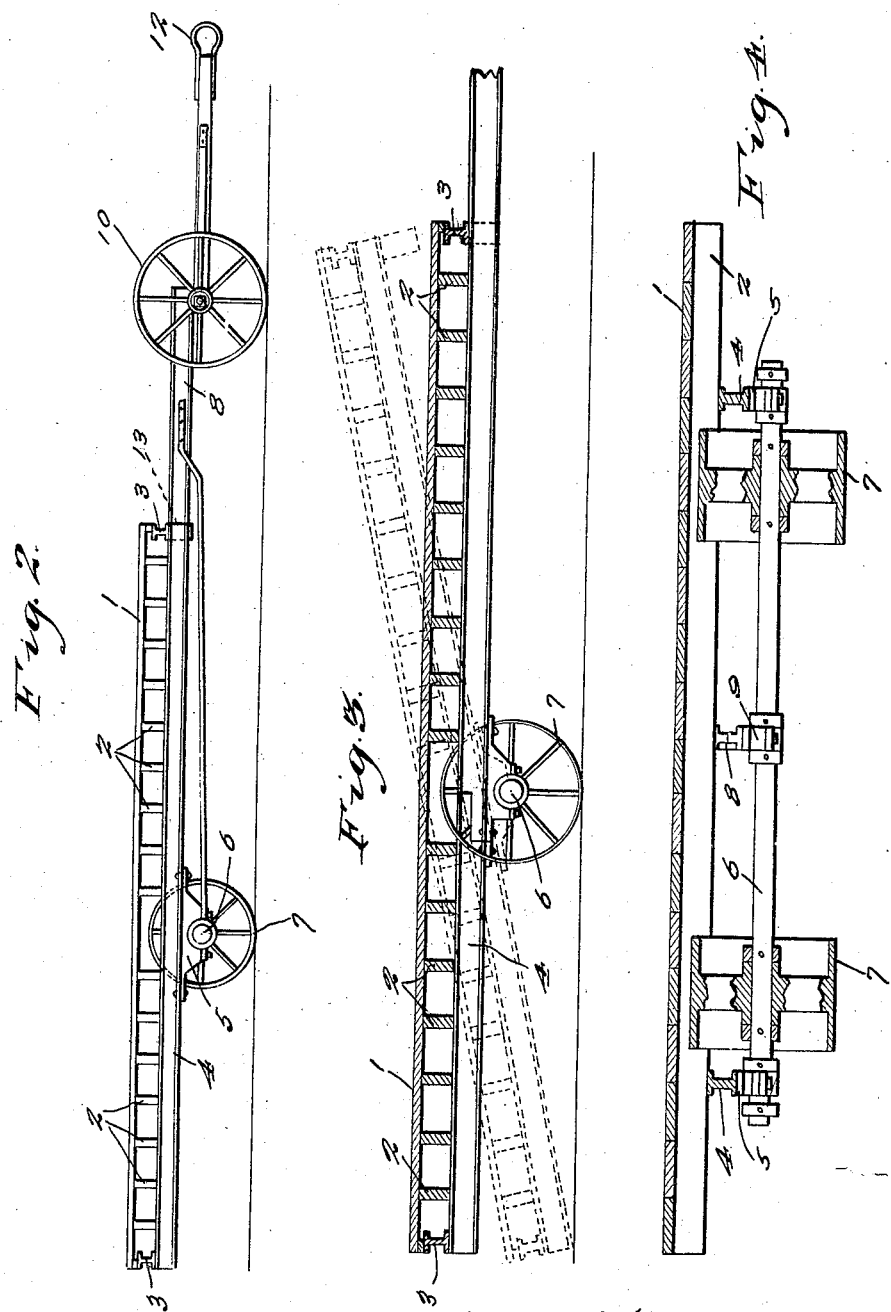

Patented May 11, 1926.

1,584,610

UNITED STATES PATENT OFFICE.

WILLIAM A. CHRISTIANS, OF HAY SPRINGS, NEBRASKA.

HAY CARRIER.

Application filed July 14, 1923. Serial No. 651,637.

This invention relates to a hay carrier, the general object of the invention being to provide a wheeled device adapted to hold a stack of hay or the like, with means for permitting the platform of the device to be tilted to discharge the stack at the point desired so that large quantities of hay and the like can be handled expeditiously.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the device with a portion of the platform removed.

Figure 2 is an elevation.

Figure 3 is a longitudinal sectional view.

Figure 4 is a transverse sectional view.

Figure 5 is a detail sectional view showing the means for preventing lateral movement of the platform when the same is in lowered position.

In these views 1 indicates a platform which is supported by the joists 2 and the end beams 3. These joists and end beams rest upon the two side beams 4 to which the blocks 5 are secured. An axle 6 has its ends engaging said blocks and said axle carries a pair of broad wheels 7. The axle is arranged a little to the rear of the center of the beams 4 so that the beams and the parts carried thereby will normally assume a horizontal position, as shown in full lines in Figure 3. A central beam 8 has its rear end connected with the center of the shaft or axle, as shown at 9, and the front end of the beam is supported by the truck 10. Braces 11 connect the beam 8 with the ends of the axle. Draft means 12 are connected with the front end of the truck so that draft animals or a tractor can be connected with the device. A pair of brackets 13 are connected with the front end beam 3 and are adapted to engage the beam 8 when the platform is in horizontal position to prevent lateral movement of the platform on the beam 8.

A space is left between the joists adjacent the wheels so that the wheels can enter said space and thus permit the parts to be arranged with the platform a few feet from the ground in order to facilitate the loading of hay or the like upon the same. The platform is of large dimensions so that a large quantity of hay can be placed thereon in the form of a stack. The device is then drawn to a point where the stack is to be placed and a rope is then tied around the lower part of the stack and to a stake or other object so that when the device is moved the stack will be pulled from the platform, which will tilt to the position shown in dotted lines in Figure 3, and thus facilitate the unloading of the stack.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A hay carrier including traction wheels, supporting axles in spaced relation and connecting said wheels, a platform comprising parallel side beams and a central beam parallel with the side beams, supporting blocks carried by said side beams and embracing one of the axles for rockably mounting said platform, end beams mounted upon the side and central beams, parallel joists mounted upon said side and central beams supporting the floor of the platform, and spaced brackets carried by one of said end beams adapted for detachable engagement with the central beam whereby to retain said platform against lateral movement when in a horizontal position, and braces attached to the central beam and extending divergently to the ends of the axle upon which the bearing blocks are mounted.

In testimony whereof I affix my signature.

WILLIAM A. CHRISTIANS.